United States Patent [19]

Hatano

[11] 4,056,990
[45] Nov. 8, 1977

[54] AUTOMATIC MULTI-SPEED TRANSMISSION AND OVERDRIVE COMBINATION

[75] Inventor: Mitsuru Hatano, Hiroshima, Japan

[73] Assignee: Toyo Kogyo Co., Ltd., Japan

[21] Appl. No.: 650,026

[22] Filed: Jan. 19, 1976

[30] Foreign Application Priority Data

Jan. 23, 1975 Japan .................................. 50-10234

[51] Int. Cl.² ............................................ F16H 57/10
[52] U.S. Cl. ..................................... 74/781 R; 74/759
[58] Field of Search ..................... 74/758, 759, 781 R, 74/753

[56] References Cited

U.S. PATENT DOCUMENTS

| | | | |
|---|---|---|---|
| 3,118,319 | 1/1964 | Straub | 74/759 X |
| 3,339,431 | 9/1967 | Croswhite et al. | 74/759 X |
| 3,477,313 | 11/1969 | Ringe | 74/781 R |
| 3,505,907 | 4/1970 | Fox et al. | 74/759 X |
| 3,797,332 | 3/1974 | Cameron et al. | 74/781 R X |
| 3,863,524 | 2/1975 | Mori et al. | 74/759 X |

Primary Examiner—Samuel Scott
Assistant Examiner—Lance W. Chandler
Attorney, Agent, or Firm—Wenderoth, Lind & Ponack

[57] ABSTRACT

Automatic multi-speed transmission and overdrive combination in which during drive other than overdrive an engine input shaft drives a fluid torque converter, the turbine of which drives a turbine shaft which connects to the pinion carrier of a planetary gear set, from which drive is supplied, by the carrier or sun gear thereof, to the input shaft of a speed change unit for transmission of drive at requisite ratios to an output shaft. During overdrive, the torque converter is by-passed, the engine input shaft being connected directly to the turbine shaft, the sun gear of the planetary gear set is held stationary, and the speed change unit input shaft is coupled to the ring gear of the gear set, thereby permitting the rotary speed of the output shaft to be maintained while the engine speed is lowered. The disclosed combination offers the principal advantages that only single-shaft transmission lines are required, that power transmission shafts need be no larger in diameter than in conventional automatic transmission means not having an overdrive mechanism, and that conventional automatic transmissions may be easily converted to a combined automatic transmission and overdrive means.

2 Claims, 5 Drawing Figures

|   |    | $C_1$ | $C_2$ | $C_3$ | $C_4$ | $B_1$ | $B_2$ | $B_4$ | $OWC_1$ |
|---|----|---|---|---|---|---|---|---|---|
| P |    |   |   |   |   |   |   |   |   |
| R |    |   | O | O |   | O |   |   |   |
| N |    |   |   |   |   |   |   |   |   |
| D | $D_1$ | O |   | O |   |   |   |   | O |
|   | $D_2$ | O |   | O |   |   | O |   |   |
|   | $D_3$ | O | O | O |   |   |   |   |   |
|   | $D_4$ | O | O |   | O |   |   | O |   |
| 2 |    | O |   | O |   |   | O |   |   |
| 1 | $I_1$ | O |   | O |   | O |   |   |   |
|   | $I_2$ | O |   | O |   |   | O |   |   |

|   |    | $C_1$ | $C_2$ | $C_3$ | $C_4$ | $B_1$ | $B_2$ | $B_4$ | $OWC_1$ | $OWC_2$ |
|---|----|---|---|---|---|---|---|---|---|---|
| P |    |   |   |   |   |   |   |   |   |   |
| R |    |   | O | O |   | O |   |   |   | O |
| N |    |   |   |   |   |   |   |   |   |   |
| D | $D_1$ | O |   | O |   |   |   |   | O | O |
|   | $D_2$ | O |   | O |   |   | O |   |   | O |
|   | $D_3$ | O | O | O |   |   |   |   |   | O |
|   | $D_4$ | O | O |   | O |   |   | O |   |   |
| 2 |    | O |   | O |   |   | O |   |   | O |
| 1 | $I_1$ | O |   | O |   | O |   |   |   | O |
|   | $I_2$ | O |   | O |   |   | O |   |   | O |

AUTOMATIC MULTI-SPEED TRANSMISSION AND OVERDRIVE COMBINATION

The present invention relates to an automatic multi-speed transmission fitted with an overdrive means, particularly for a motor vehicle such as an automobile, which is engaged automatically when an automobile is driven in a certain speed range.

In order to provide improved automobile operation economy it is known to provide overdrive means which permits automobile speed to be maintained constant despite lowering of engine speed. It is also known to provide an automatic transmission system in an automobile, in order facilitate driving of the automobile, such an automatic transmission generally having as principal elements a torque converter and planetary gear sets having associated therewith brakes and clutches which may be actuated automatically to effect different drive transmission ratios. It is considered advantageous to provide an automatic transmission and overdrive means in one and the same automobile, and a representative and commonly employed popular means for effecting such a combination is the so-called Simpson-type automatic transmission such as disclosed in U.S. Pat. No. 3,217,563, entitled 'Duplex Gear Transmission And Hydrodynamic Drive Combination.' As shown in FIG. 1, such a transmission comprises a torque converter including a pump P, turbine T and stator S. Pump P is attached through the front shell of the torque converter to the carrier gear U of an overdrive planetary gear set OG which is provided between pump P and an input shaft IP. Acting through suitable plates the input shaft IP rotates the carrier gear U, whereby the convertor pump P also is driven. The hub of the ring gear U is splined to an output shaft OD, which drives the vehicle and which turns inside a hollow shaft HS, which is connected to the ring gear of the main transmission. The hub of the converter turbine T is splined to the hollow shaft HS. The stator S is prevented from rotating backwards by a one-way clutch SOC, and is held in place by suitable connection to a stator support SS.

The planetary gear set OG may be turned as a unit substantially at engine speed, but when a particular speed is reached the sun gear SG of the planetary gear set OG may be prevented from rotation by actuation of a brake means B, whereby the rotary speed of the ring gear U, and hence of the output shaft OD, may be made different from that of the input shaft IP.

The Simpson type transmission means offers the main advantage that it is possible to employ an overdrive in combination with a hydrodynamic drive means, which combination had been previously considered either impossible or impractical. However, the means has the following disadvantages. Firstly, since the output shaft OD must be passed through the hollow shaft HS which normally supplies drive to the main transmission, the hollow shaft HS must necessarily have a large diameter. In terms of construction of the transmission means this has the disadvantages that the hollow shaft HS, output shaft OD and one-way clutch SOC or stator support SS together constitute a triple shaft arrangement, which is known to present difficulty with respect to automobile assembly and maintenance, and that the bushing of the hollow shaft HS must be large, with a consequently increased risk of cracking or other damage to welds at high frequencies of vibration caused by movement of the automobile. Also, when the overdrive gear set OG is provided at the rear of and acts to drive the torque converter, the inner diameter of the overdrive planetary gear set OG becomes large, thereby making the size of the planetary gear set OG large.

Another disadvantage is that since the overdrive planetary gear set OG is frequently rotated as a whole at close to engine speed, the overdrive brake B and associated elements are frequently rotated at high speed, resulting in a large amount of vibration and noise, and risk of breakage or weakening of welds.

A further disadvantage is that when the transmission is driven in reverse, since the ring gear U and output shaft OD are rotated in reverse, flow of oil, or other fluid through the converter is opposite to the flow which occurs during forward drive of the transmission, and there is consequently reduced efficiency and increased oil loss.

It is accordingly a principal object of the present invention to provide an automatic multi-speed transmission and overdrive combination which overcomes the disadvantages present in the above described conventional means.

A further object of the invention is to provided an automatic multi-speed transmission and overdrive combination wherein the direction of fluid flow in a fluid torque converter included in the combination is the same regardless of whether the transmission is driven forwards or in reverse.

Another object of the invention is to provide an automatic multi-speed transmission and overdrive combination which has a compact and economical construction.

Yet another object of the invention is to provide an automatic multi-speed transmission and overdrive combination which may be easily installed in a motor vehicle, such as an automobile, by minor remodeling of the conventional members in an automobile having an automatic multi-speed transmission which does not have an overdrive mechanism, thereby making possible a modification to convert an existing automobile having no overdrive mechanism into a custom-made automobile having an overdrive mechanism.

In accomplishing these and other objects there is provided, according to the present invention, an automatic multi-speed transmission and overdrive combination wherein normally, i.e., at times other than during overdrive operation, an input shaft supplying input from an automobile engine is connected to the pump of a fluid torque converter and acts to drive the converter. Output from the converter is normally taken out by a turbine shaft which is connected to the converter turbine and also to the carrier of an overdrive planetary gear set, which is therefore driven by the turbine shaft. A speed change unit input shaft, which is connected by a clutch means to and is normally driven by the sun gear of the overdrive planetary gear set, supplies output from the planetary gear set to an automatic multi-speed change unit, which transmits drive at a requisite speed ratio to a transmission output shaft. Between the engine input shaft and the converter there is provided a lock-up clutch, which, when the automobile speed reaches a suitable cruising speed at which it is desirable to lower engine speed, is actuated to cause direct connection between the engine input shaft and the turbine shaft. At the same time a brake means is actuated to hold the sun gear of the overdrive planetary gear set stationary and the speed change unit input shaft is disconnected from the sun gear and connected to the ring gear of the overdrive planetary gear set, whereby the speed change unit input shaft is rotated faster than the input shaft supplying drive from the automobile engine.

With this construction it is to be noted that only a single, solid turbine shaft such as is normally employed in a hydrodynamic drive system is required both for the standard drive transmission and for the overdrive, and there is therefore no need for an additional overdrive shaft, there is no problem of maintaining a solid shaft and a hollow shaft coaxial therewith, or of multi-shaft construction.

In addition to this there is the advantage that since the torque converter is bypassed during overdrive there is no problem of fluid slip.

According to a second embodiment of the invention, to keep torque imposed on the clutch means provided between the overdrive planetary gear set and the input shaft of the speed change unit to a minimum, there is further provided a one-way clutch which provides a connection during forward drive of the automobile, the above-mentioned clutch means being required to transmit only the relatively small amount of torque necessary during reversing.

A better understanding of the present invention may be had from the following full description thereof when read in reference to the attached drawings in which like numerals refer to like parts, and in which.

For the purpose of the description hereinafter, the term 'normal drive' is taken to mean drive transmission in reverse drive and in the first speed gear, second speed gear, and D1, D2 and D3 drive ranges, that is a drive transmission mode other than overdrive the overdrive range being identified below as the 'D4 drive range.'

Figure 1:
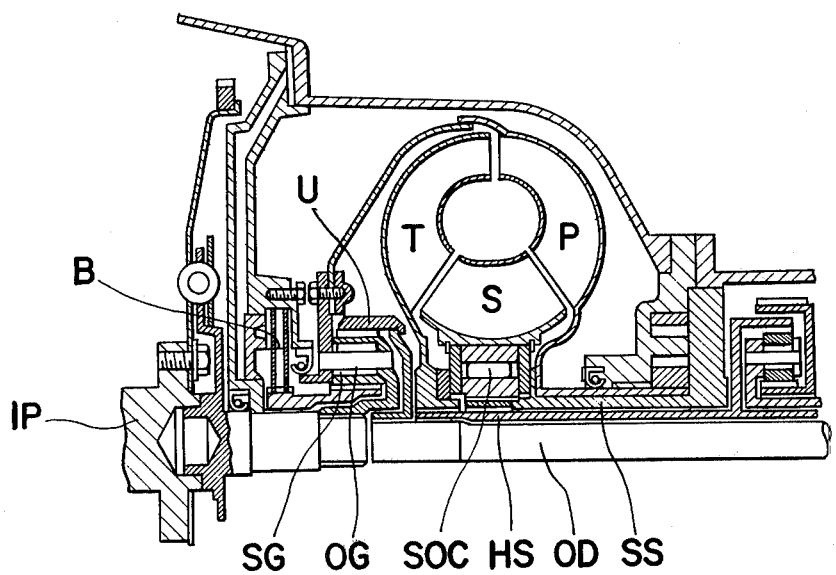
FIG. 1 is a partial sectional elevation of a conventional overdrive means for an automatic transmission.
Figure 2:
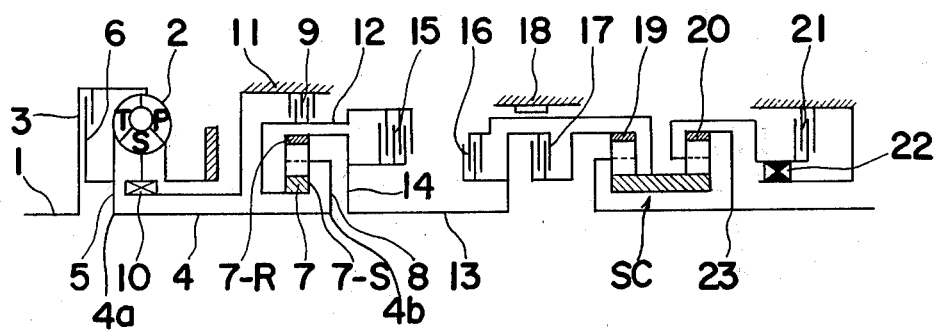
FIG. 2 is a diagrammatic drawing showing power transmission in an automatic transmission and overdrive combination according to a first embodiment of the invention.

Referring to FIG. 2, an engine input shaft 1 supplying drive from an engine is connected to the front plate 3 of a fluid torque converter. The front plate 3 is connected to the pump P of the torque converter, which is therefore driven by the engine input shaft 1 acting through the front plate 3. The turbine T of the torque converter is normally connected to a connection means 5 which is permanently connected to one end 4a of a turbine shaft 4 and transmits drive to rotate the turbine shaft 4. Thus, in normal drive the input shaft 1 acting through the front plate 3 drives the converter pump P, the pump P drives the turbine T, and the turbine T acting through the connection means 5 drives the turbine shaft 4.

In overdrive a lock-up clutch 6, which is provided between the engine input shaft 1 and the torque converter, is actuated and provides a direct connection between the engine input shaft 1 and the turbine shaft 4, whereby the torque converter is bypassed and the turbine shaft 4 is driven directly by the engine input shaft 1.

Backward rotation of the stator S of the torque converter is prevented by a one-way clutch 10, which is supported on a fixed stator support 11. The stator support 11 also supports an overdrive brake 9 which is associated with a drive planetary gear set 7, and which when actuated holds the sun gear 7-S of the gear set 7 stationary.

The other end 4b of the turbine shaft 4 is connected to the carrier 8 of the overdrive planetary gear set 7. Drive output from the planetary gear set 7 is supplied to a second input shaft 13 which supplies drive to a speed change gear unit SC. Between the gear set 7 and second input shaft 13 there is provided a connector shaft 14, or similar connection means, which is connected permanently to the second input shaft 13, and which during overdrive is connected to the ring gear 7-R of the gear set 7, whereby the shaft 13 is driven at the same rotary speed as the ring gear 7-R. During normal drive, a normal drive clutch 15 is actuated to connect the connector shaft 14 to the sun-gear 7-S of the gear set 7, instead of to the ring gear 7-R, and the second input shaft 13 is rotated at the same speed as the sun gear 7-S. The speed change gear unit SC transmits input from the second input shaft 13 at requisite ratios of shaft rotation to an output shaft 23, which drives the automobile.

The speed change gear unit SC may have any one of many conventional constructions, and in this particular embodiment comprises a front clutch 16, rear clutch 17, second brake 18, front planetary gear set 19, rear planetary gear set 20, low-reverse brake 21, and one-way clutch 22, which is employed during drive in the D1 range. Operation of the speed change gear unit comprising such elements is well-known, and a description thereof is therefore omitted here.

Figures 3, 4, 5:
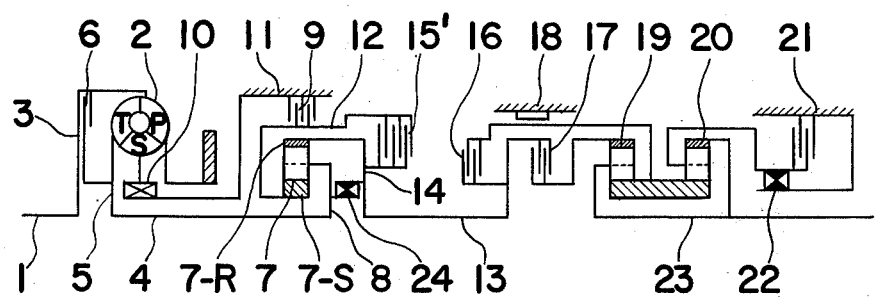
FIG. 3 is an actuation chart showing actuation of elements of the embodiment of FIG. 2.
FIG. 4 is a diagrammatic drawing showing power transmission in a second embodiment of the invention.
FIG. 5 is an actuation chart showing actuation of elements of the embodiment of FIG. 4.

Still referring to FIG. 2 and also referring to FIG. 3 which shows actuation of the various elements of the abovedescribed means for different modes of automobile drive, actuation of an element being indicated by a circle in the relevant box in the drawing, the operation of the abovedescribed means is as follows. In FIG. 3, the abbreviations P, R, N, and D stand for 'parking,' 'reverse,' 'neutral,' and 'drive,' respectively, and '1' and '2' indicate first speed gear drive and second speed gear drive, both of which are in the manual gear actuation range, and 1 (1) being first and low drive, for automobile motion on steep inclines, and 1 (2) being first gear drive for starting the automobile under standard conditions.

Throughout normal drive the lock-up clutch 6 is disengaged, the overdrive brake 9 is unactuated, and the normal drive clutch 15 is actuated. Engine drive supplied by the engine input shaft 1 is passed through the fluid torque converter to the turbine shaft 4, supplied by the turbine shaft 4 to the drive planetary gear set 7, and transmitted by the sun gear 7-S of the gear set 7 to the second input shaft 13, which supplies the drive to the speed change unit SC. The elements 16 through 22 of the speed change unit SC are actuated as indicated in FIG. 3 in order to transmit drive at requisite ratios from the second input shaft 13 to the output shaft 23, actuation being effected by known hydraulic or electric means, being automatic in the drive range D, and being controlled by manual means during reverse drive and first and second speed gear drive. When speed range D3 is reached the front clutch 16 and rear clutch 17 are both actuated, whereby the speed change unit simply acts to transmit drive directly from the second input shaft 13 to the output shaft 23. In this condition therefore there is effectively direct drive transmission from the engine input shaft 1 to the output shaft 23, and the automobile is ready to go into overdrive.

When overdrive range D4 is reached, the clutches 16 and 17 remain actuated, whereby the speed change unit continues to transmit direct drive from the second input shaft 13 to the output shaft 23. Also, the lock-up clutch 6 is actuated, the overdrive brake 9 is applied, and the normal drive clutch 15 is disengaged, this action being effected automatically by known hydraulic or other means. Thus the torque converter is bypassed, the engine input shaft 1 is connected directly to the turbine shaft 4, and the second input shaft 13 is connected to and driven by the ring gear 7-R of the drive planetary gear set 7. The sun gear 7-S of the gear set 7 now being held stationary by the brake 9, the ring gear 7-R and second input shaft 13 are turned faster than the engine input shaft 1 and turbine shaft 4, thus the permitting engine speed to be lowered.

Needless to say, it is not essential that the speed change gear unit SC transmit direct drive between shafts 13 and 23 when both clutches 16 and 17 are actuated, i.e., in drive ranges D3 and D4, but it may transmit drive at any fixed ratio at this time. Also, of course, during normal drive the connector shaft 14 may be connected to the carrier 8 of the drive planetary gear set 7.

It will be noted that the means of the invention permits easy improvement of an automobile construction including automatic transmission means, but not having an overdrive means, since transmission from an engine input shaft to a speed change gear unit is effected along a single axis. The planetary gear set for transmitting both normal and overdrive which is included in this transmission line is only required to drive ordinary, single shafts, and may therefore be compact and is easily mounted. To render the means as a whole more compact the sun gears of all of the planetary gear sets 7, 19, and 20 may be mounted on a common shaft.

Referring to FIG. 4, according to another embodiment of the invention, increased strength of the transmission line construction is obtained by providing between the planetary gear set 7 and the connector shaft 14 a one-way clutch 24 as well as an ordinary clutch 15'. The one-way clutch 24 transmits only forward drive to the connector shaft 14. As indicated in the actuation table of FIG. 5, both the clutch 15' and the one-way clutch 24 are actuated during normal drive. The one-way clutch 24 carries the major portion of the torque load drive transmission to the connector shaft 14 and second input shaft 13 during forward normal drive, and the clutch 15' is required only to carry the light torque load occurring during reverse drive of an automobile. Thus, since a one-way clutch may have a sturdier construction, coupling between the planetary gear set 7 and the input shaft 13 is stronger and provides longer service. In addition to this there is the advantage that in going into overdrive the one-way clutch 24 may momentarily carry the entire transmission load to the input shaft 13.

Although the present invention has been fully described by way of example with reference to the attached drawings, it is to be noted that various changes and modifications will be apparent to those skilled in the art. For example, the overdrive mechanism can be operated either by automatic controlling means such as is used in the automatic drive range $D_1$ or by manual operation means such as is used in the manual drive range D. Therefore, unless otherwise such changes and modifications depart from the scope of the present invention, they should be construed as being included therein.

What is claimed is:
1. An automatic multi-speed transmission and overdrive combination comprising:
   a. engine input shaft for connection to an engine and supplying drive therefrom;
   b. a fluid torque converter having a pump, a turbine, and a stator;
   c. an overdrive unit having a planetary gear set with a sun gear, a ring gear, pinion gears and a carrier, said sun gear and ring gear being separated by and meshing with the pinion gears supported by the rotary carrier,
   first brake means engagable with and actuable to prevent rotation of said sun gear, and
   normal drive clutch means connected to said sun gear for being actuated during normal drive of said combination;
   d. a multi-speed change gear unit;
   e. first connection means connecting said engine input shaft with said pump of the fluid torque converter for driving said converter;
   f. a turbine shaft connecting said turbine of the fluid torque converter with said carrier of said planetary gear set of said overdrive unit for driving said planetary gear set;
   g. a second input shaft connecting to said multi-speed change gear unit and selectively connectable to said normal drive clutch means and to said ring gear of the overdrive unit, whereby said multi-speed change gear unit may be normally driven by said sun gear of the planetary gear set and may be driven by said ring gear of the planetary gear set during non-actuation of said normal drive clutch means;
   h. an output shaft for supplying output drive from said multi-speed change gear unit to an automobile wheel unit drive means;
   i. means including said first connection means, said turbine shaft, and said second input shaft for connecting said fluid torque converter, said overdrive unit, and said multi-speed change gear unit, in series;
   j. normally unactuated lock up clutch means connecting said engine input shaft directly to said turbine shaft for bypassing said fluid torque converter during overdrive operation; and
   k. a one-way clutch means which is provided in association with said normal drive clutch means, and which during forward normal drive transmission by said combination carries a portion of torque load imposed in transmission of drive from said turbine shaft to said second input shaft.

2. Automatic multi-speed transmission and overdrive combination as recited in claim 1, wherein said multi-speed change gear unit includes a front planetary gear set and a rear planetary gear set, each comprising a sun gear and a ring gear which are separated by and meshed with pinion gears supported by a rotary carrier, said front - and said rear planetary gear sets constituting a drive transmission line between said second input shaft and said output shaft, and a plurality of clutch and brake means selectively and automatically actuable to cause said front and rear planetary gear sets to transmit said drive at different speed ratios, and wherein said sun gears of said drive planetary gear set, of said front planetary gear set and of said rear planetary gear set are mounted on a common shaft.

* * * * *